US011316426B2

(12) United States Patent
Grbovic et al.

(10) Patent No.: US 11,316,426 B2
(45) Date of Patent: Apr. 26, 2022

(54) POWER CONVERTER USED IN A RENEWABLE ENERGY DEVICE SUCH AS A PHOTO-VOLTAIC DEVICE OR A WIND ENERGY DEVICE

(71) Applicant: Huawei Digital Power Technologies Co., Ltd., Shenzhen (CN)

(72) Inventors: Petar Grbovic, Munich (DE); Roland Huempfner, Munich (DE); Jose Antonio Cobos, Madrid (ES); Pedro Alou, Madrid (ES); Jesus Angel Oliver, Madrid (ES); Miroslav Vasic, Madrid (ES)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/934,248

(22) Filed: Jul. 21, 2020

(65) Prior Publication Data

US 2020/0412239 A1 Dec. 31, 2020

Related U.S. Application Data

(63) Continuation of application No. PCT/EP2018/051546, filed on Jan. 23, 2018.

(51) Int. Cl.
*H02M 7/483* (2007.01)
*H02M 7/487* (2007.01)
(Continued)

(52) U.S. Cl.
CPC .............. *H02M 3/07* (2013.01); *H02J 3/381* (2013.01); *H02M 3/158* (2013.01); *H02M 7/537* (2013.01);
(Continued)

(58) Field of Classification Search
CPC ...... H02M 3/07; H02M 3/073; H02M 1/0058; H02M 1/0022
See application file for complete search history.

(56) References Cited

U.S. PATENT DOCUMENTS 9,825,545 B2 * 11/2017 Chen ...................... H02M 3/158
10,644,503 B2 * 5/2020 Perreault ............... H02M 3/335
(Continued)

FOREIGN PATENT DOCUMENTS

CN 107947616 A 4/2018
EP 2410648 A1 * 1/2012 ........... H03K 17/102
(Continued)

OTHER PUBLICATIONS

XP011640850 Yuanmao Ye et al.,"Topology, Modeling, and Design of Switched-Capacitor-Based Cell Balancing Systems and Their Balancing Exploration", IEEE Transactions on Power Electronics ( vol. 32 , Issue: 6 , Jun. 2017 ),total 11 pages.

*Primary Examiner* — Sisay G Tiku
(74) *Attorney, Agent, or Firm* — Womble Bond Dickinson (US) LLP

(57) ABSTRACT

A DC/DC power converter comprises three or more capacitors connected in series between an output terminal and a ground terminal, the three or more capacitors being connected in series by means of two or more capacitor connection points, and an input voltage switching unit configured to connect an input terminal to one of a group of switching connection points, the group of switching connection points comprising the two or more capacitor connection points and the output terminal. With such a DC/DC power converter it is possible, for example, to convert a variable DC voltage at the input into a variable DC voltage at the output, wherein the voltage range of the output voltage is smaller than the voltage range of the input voltage.

20 Claims, 5 Drawing Sheets

(51) Int. Cl.
*H02M 3/07* (2006.01)
*H02M 3/158* (2006.01)
*H02M 1/00* (2006.01)
*H02J 3/38* (2006.01)
*H02M 7/537* (2006.01)

(52) U.S. Cl.
CPC ....... *H02J 2300/24* (2020.01); *H02J 2300/28* (2020.01); *H02M 1/007* (2021.05); *H02M 1/0077* (2021.05)

(56) References Cited

U.S. PATENT DOCUMENTS

| | | | |
|---|---|---|---|
| 10,897,145 B2 * | 1/2021 | De Breucker | H02J 7/0021 |
| 11,101,674 B2 * | 8/2021 | Walley | H02J 7/00 |
| 2008/0253156 A1 | 10/2008 | Urakabe et al. | |
| 2012/0200163 A1 * | 8/2012 | Ito | H02J 7/0024 |
| | | | 307/77 |
| 2013/0229841 A1 * | 9/2013 | Giuliano | H02M 1/4225 |
| | | | 363/60 |
| 2014/0118063 A1 * | 5/2014 | Briffa | H03F 1/025 |
| | | | 330/124 R |
| 2015/0155895 A1 * | 6/2015 | Perreault | H02M 3/07 |
| | | | 455/127.3 |
| 2018/0069490 A1 * | 3/2018 | Fu | H02M 7/539 |

FOREIGN PATENT DOCUMENTS

| | | | |
|---|---|---|---|
| EP | 2863529 A1 | 4/2015 | |
| JP | 2008072856 A | * | 3/2008 |

\* cited by examiner

POWER CONVERTER USED IN A RENEWABLE ENERGY DEVICE SUCH AS A PHOTO-VOLTAIC DEVICE OR A WIND ENERGY DEVICE

CROSS-REFERENCE TO RELATED APPLICATIONS

This application is a continuation of International Application No. PCT/EP2018/051546, filed on Jan. 23, 2018, the disclosure of which is hereby incorporated by reference in its entirety.

FIELD OF THE INVENTION

The present invention relates to a power converter, especially to a power converter used in a renewable energy device such as a photo-voltaic device or a wind energy device.

BACKGROUND

Solar systems are systems used to convert the sun's radiation energy into electric energy. In some applications the electric energy is directly used by a local load, while in some applications the produced electric energy is pumped back to an electric grid. A solar conversion system is composed of a photovoltaic panel that produces a DC voltage/current from solar energy and a power converter that converts the generated DC voltage/current into an AC voltage/current which is suited to drive the local load or to be pumped back to the electric grid.

Among the most important requirements of solar conversion systems are harvesting and efficiency. Harvesting in this context means to extract as much power as possible from the photovoltaic panel under the given circumstances. Efficiency is the ratio between the power supplied to the load or grid and the power extracted from the photovoltaic panel. Currently, the best product on market has an efficiency of <98.8%.

A common approach for such a power conversion is a single conversion. This means that a DC voltage or current produced by a photovoltaic panel is converted to an AC voltage or current in a single step. FIG. 4 shows a schematic block diagram of such a conventional DC/AC power converter with single conversion.

In the conventional DC/AC power converter 1100, a photovoltaic panel 1110 is connected to an input of a three-phase DC/AC power converter 1130. A three phase PWM inverter may, for example, be used as the DC/AC power converter 1130. A bus capacitor 1140 is connected in parallel to the input of the DC/AC power converter 1130. The output of the DC/AC power converter 1130 is connected to a three-phase electric grid 1150.

The DC/AC power converter 1130 converts a DC voltage supplied by the photovoltaic panel 1110 into a three-phase AC voltage that is fed to the electric grid 1150. However, the DC voltage supplied by the photovoltaic panel 1110 varies over time, and so does the DC bus voltage Vbus at the input of the DC/AC power converter 1150.

Among the main drawbacks of this approach are:
The photovoltaic panel cannot be operated in an optimum way which results in a low harvesting of the entire system.
If an interconnection transformer is used, the output voltage is reduced, yielding 270 V up to 330 V phase to phase.
It is not possible to reduce the output voltage in the case of grid connected transformer-less applications.
High conduction losses are caused.

To avoid those drawbacks, a double conversion is generally used. This means that in a first step, a DC voltage or current produced by a photovoltaic panel is converted into another DC voltage or current which then is converted into an AC voltage or current in a second step. FIG. 5 shows a schematic block diagram of such a conventional DC/AC power converter with double conversion and constant intermediate dc link voltage.

In the conventional DC/AC power converter 1200, a photovoltaic panel 1210 is connected to an input of a DC/DC power converter 1220. A boost DC/DC converter may, for example, be used as the DC/DC power converter 1120. An output of the DC/DC power converter 1120 is connected to an input of a three-phase DC/AC power converter 1230. A three phase PWM inverter may, for example, be used as the DC/AC power converter 1230. A bus capacitor 1240 is connected in parallel to the input of the DC/AC power converter 1230. The output of the DC/AC power converter 1230 is connected to a three-phase electric grid 1250.

The DC/DC power converter 1120 converts a DC voltage supplied by the photovoltaic panel 1210 into another DC voltage. In the present example, even if the DC voltage supplied by the photovoltaic panel 1210 varies over time, the DC bus voltage Vbus at the output of the DC/DC power converter 1120, and thus at the input of the DC/AC power converter 1250, is constant. This constant DC bus voltage Vbus is then converted by the DC/AC power converter 1230 into a three-phase AC voltage that is fed to the electric grid 1250.

Among the main drawbacks of this approach are:
Large input inductors are required.
The input boost converter has high switching and conduction losses.
High voltage switches are required.
Electromagnetic compatibility issues may arise.

Double conversions may also be realized using different concepts. For example, full envelope tracking of the dc bus voltage may be used. The DC bus voltage in this case is not constant, but has the form of a rectified envelope of a sinusoidal voltage. Therefore no switching losses occur on the output bridge switches, but high conduction losses on the output H bridge. However, this concept cannot be applied to a three-phase solar system with a common input. Another drawback is the large input boost inductor required and high losses on the input boost converter.

Another concept is a convertor with partial envelope tracking of the bus voltage. Also in this case, the DC bus voltage is not constant, but follows the output voltage envelope. Thus, switching losses are reduced and a smaller output inductor is required. However, a large input boost inductor is required, which results in high losses on the input boost converter.

All those approaches have drawbacks which affect the efficiency and harvesting of the power converters.

SUMMARY

It is therefore an object of the present invention to provide a power converter having an increased efficiency and harvesting.

The foregoing and other objects are achieved by the features of the independent claims. Further embodiments are apparent from the dependent claims, the descriptions and the figures.

According to a first aspect, a DC/DC power converter is provided. The DC/DC power converter has an input terminal, an output terminal, and a ground terminal. The DC/DC power converter comprises three or more capacitors connected in series between the output terminal and the ground terminal, the three or more capacitors being connected in series by means of two or more capacitor connection points, and an input voltage switching unit configured to connect the input terminal to one of a group of switching connection points, the group of switching connection points comprising the two or more capacitor connection points and the output terminal.

With such a DC/DC power converter it is possible, for example, to convert a variable DC voltage at the input into a variable DC voltage at the output, wherein the voltage range of the output voltage is smaller than the voltage range of the input voltage. Thereby it is possible, for example, to improve the operating conditions of a subsequent DC/AC converter which may result in a larger range of the input voltage for the total power conversion, in an improved overall efficiency of the power conversion as well as in an improved harvesting of energy from a variable voltage source such as a photo-voltaic device or a wind energy device.

In one embodiment, the DC/DC power converter is configured to select one of the switching connection points based on an input voltage applied to the input terminal, and to control the input voltage switching unit so as to connect the input terminal to the selected switching connection point.

Thereby it is possible, for example, to select a ratio between and output voltage of the DC/DC power converter and the input voltage.

In a further embodiment, the DC/DC power converter is configured to select the switching connection point to which the input terminal is to be connected in a way that the output voltage is greater than a minimum voltage specified in advance.

Thereby it is possible, for example, to keep the output voltage above a predetermined value thereby improving the operating conditions of a subsequent DC/AC converter.

In a further embodiment, the input voltage switching unit comprises three or more input switches, and each of the input switches is connected between the input terminal and a different switching connection point.

Thereby it is possible, for example, to realize the input voltage switching unit in a simple and easy-to operate way.

In a further embodiment, the DC/DC power converter further comprises two or more step-up converters, wherein each step-up converter has a first terminal, a second terminal and third terminal each of which is connected to one of a group of converter connection points, the group of converter connection points comprising the two or more capacitor connection points, the output terminal, and the ground terminal, and each step-up converter is configured to convert a voltage applied between its first and second terminal to a greater voltage between its first and third terminal.

Thereby it is possible, for example, to distribute the DC/DC power conversion to multiple step-up converters. Depending on the connection of each step-up converters, its components need not be rated for the maximum output voltage, but only for a partial voltage thereof, which may result in lower costs and lower losses.

In a further embodiment, the step-up converters are resonant converters, each comprising: a resonance capacitor and a resonance inductor connected in series to each other between a first and a second internal node, a first internal switch connected between the first terminal and the first internal node, a second internal switch connected between the first internal node and the third terminal, a third internal switch connected between the third terminal and the second internal node, and a fourth internal switch connected between the second internal node and the second terminal.

Thereby it is possible, for example, to efficiently realize the step-up converters.

In a further embodiment, the internal switches are formed as semiconductor switches.

Thereby it is possible, for example, to realize the internal switches without needing mechanical parts. Especially if MOSFETs are used, they are easy to be controlled, for example by a gate driver.

In a further embodiment, the DC/DC power converter is further configured to operate each of the resonant converters by alternately toggling between a first state in which the first and third internal switches are closed and the second and fourth internal switches are opened, and a second state in which the first and third internal switches are opened and the second and fourth internal switches are closed.

Thereby it is possible, for example, to efficiently generate a voltage by each of the resonant converters which is higher than their corresponding input voltage.

In a further embodiment, the DC/DC power converter is further configured to operate the resonant converters in a way that the internal switches are switched with a duty cycle of approximately 50%.

Thereby it is possible, for example, to achieve an efficient operation of the resonant converters.

In a further embodiment, the DC/DC power converter is further configured to select, depending on the selected switching connection points to which the input terminal is to be connected, which of the step-up converters is to be operated and which is not be operated.

Thereby it is possible, for example, to operate only the step-up converter(s) which is or are needed to generate the output voltage which may result in decreased losses and an increased efficiency.

In a further embodiment, the input switches are formed as electromechanical conductors and/or the input switches are formed as semiconductor switches, and/or the input switches are formed each as a series connection of three or more MOSFETs.

Thereby it is possible, for example, to realize the input switches in different ways. Especially if semiconductor switches such as MOSFETs are used, they are easy to be controlled, for example by a gate driver.

In a further embodiment, the three or more MOSFETs are connected in a way that an asymmetric blocking voltage capability is provided.

Thereby it is possible, for example, to achieve different blocking voltage capabilities in different directions, thus providing a required reverse blocking capability.

The above object is also achieved in accordance with a second aspect.

According to the second aspect, a method of operating a DC/DC power converter is provided. The method comprises applying an input voltage between an input terminal and a ground terminal of the DC/DC power converter, and supplying the input voltage via an input voltage switching unit to one of a group of switching connection points, the group of switching connection points comprising two or more capacitor connection points by which three or more capacitors are connected in series between the output terminal and the ground terminal, and the output terminal.

With such a method it is possible, for example, to convert a variable DC voltage at the input into a variable DC voltage at the output, wherein the voltage range of the output voltage is smaller than the voltage range of the input voltage. Thereby it is possible, for example, to improve the operating conditions of a subsequent DC/AC converter which may result in a larger range of the input voltage for the total power conversion, in an improved overall efficiency of the power conversion as well as in an improved harvesting of energy from a variable voltage source such as a photo-voltaic device or a wind energy device.

In an embodiment, the method further comprises selecting one of the switching connection points based on an input voltage applied to the input terminal, and controlling the input voltage switching unit so as to connect the input terminal to the selected switching connection point.

Thereby it is possible, for example, to select a ratio between and output voltage of the DC/DC power converter and the input voltage.

In a further embodiment, the method further comprises selecting the switching connection point to which the input terminal is to be connected in a way that the output voltage is greater than a minimum voltage specified in advance.

Thereby it is possible, for example, to keep the output voltage above a predetermined value thereby improving the operating conditions of a subsequent DC/AC converter.

In a further embodiment, the input voltage switching unit comprises three or more input switches, and each of the input switches is connected between the input terminal and a different switching connection point.

Thereby it is possible, for example, to realize the input voltage switching unit in a simple and easy-to operate way.

In a further embodiment, the DC/DC power converter further comprises two or more step-up converters, wherein each step-up converter has a first terminal, a second terminal and third terminal each of which is connected to one of a group of converter connection points, the group of converter connection points comprising the two or more capacitor connection points, the output terminal, and the ground terminal, and each step-up converter is configured to convert a voltage applied between its first and second terminal to a greater voltage between its first and third terminal.

Thereby it is possible, for example, to distribute the DC/DC power conversion to multiple step-up converters. Depending on the connection of each step-up converters, its components need not be rated for the maximum output voltage, but only for a partial voltage thereof, which may result in lower costs and lower losses.

In a further embodiment, the step-up converters are resonant converters, each comprising: a resonance capacitor and a resonance inductor connected in series to each other between a first and a second internal node, a first internal switch connected between the first terminal and the first internal node, a second internal switch connected between the first internal node and the third terminal, a third internal switch connected between the third terminal and the second internal node, and a fourth internal switch connected between the second internal node and the second terminal.

Thereby it is possible, for example, to efficiently realize the step-up converters.

In a further embodiment, the internal switches are formed as semiconductor switches.

Thereby it is possible, for example, to realize the internal switches without needing mechanical parts. Especially if MOSFETs are used, they are easy to be controlled, for example by a gate driver.

In a further embodiment, the method further comprises operating each of the resonant converters by alternately toggling between a first state in which the first and third internal switches are closed and the second and fourth internal switches are opened, and a second state in which the first and third internal switches are opened and the second and fourth internal switches are closed.

Thereby it is possible, for example, to efficiently generate a voltage by each of the resonant converters which is higher than their corresponding input voltage.

In a further embodiment, the method further comprises operating the resonant converters in a way that the internal switches are switched with a duty cycle of approximately 50%.

Thereby it is possible, for example, to achieve an efficient operation of the resonant converters.

In a further embodiment, the method further comprises selecting, depending on the selected switching connection points to which the input terminal is to be connected, which of the step-up converters is to be operated and which is not be operated.

Thereby it is possible, for example, to operate only the step-up converter(s) which is or are needed to generate the output voltage which may result in decreased losses and an increased efficiency.

In a further embodiment, the input switches are formed as electromechanical conductors, and/or the input switches are formed as semiconductor switches, and/or the input switches are formed each as a series connection of three or more MOSFETs.

Thereby it is possible, for example, to realize the input switches in different ways. Especially if semiconductor switches such as MOSFETs are used, they are easy to be controlled, for example by a gate driver.

In a further embodiment, the three or more MOSFETs are connected in a way that an asymmetric blocking voltage capability is provided.

Thereby it is possible, for example, to achieve different blocking voltage capabilities in different directions, thus providing a required reverse blocking capability.

The above object is also achieved in accordance with a third aspect.

According to the third aspect, a double stage DC/AC power converter is provided. The double stage DC/AC power converter comprises a DC/DC power converter according to one embodiment, and a DC/AC power converter connected to the output terminal of the DC/DC power converter.

With such a AC/DC power converter it is possible, for example, to convert a variable DC voltage at the input into a variable DC voltage at the output of the DC/DC power converter, wherein the voltage range of the output voltage is smaller than the voltage range of the input voltage, and then to convert the variable DC voltage having the smaller voltage range into an AC voltage that may be consumed in a load or that may be fed to a power grid. Thereby it is possible, for example, to improve the operating conditions of the DC/AC converter which may result in a larger range of the input voltage for the total power conversion, in an improved overall efficiency of the power conversion as well as in an improved harvesting of energy from a variable voltage source such as a photo-voltaic device or a wind energy device.

In one embodiment, the DC/AC power converter is a single-phase or multiple-phase DC/AC power converter, and/or a DC voltage source having a variable output voltage is connected to an input terminal of the DC/DC power device.

Thereby it is possible, for example, to convert a variable input DC voltage into an output AC voltage adapted to the type of load or grid.

In a further embodiment, the DC voltage source having a variable output voltage is a photo-voltaic device or a wind energy device.

Thereby it is possible, for example, to apply the double stage DC/AC power converter to applications for electric power generation from renewable resources which due to the variable nature of the primary energy used deliver a varying output voltage.

The above object is also achieved in accordance with a fourth aspect.

According to the fourth aspect, a method of operating a AC/DC power converter is provided. The method comprises converting a DC input voltage into a DC output voltage using a method according to one embodiment, and converting the DC output voltage into an AC output voltage using a DC/AC power converter.

With such method it is possible, for example, to convert a variable DC voltage at the input into a variable DC voltage at the output of the DC/DC power converter, wherein the voltage range of the output voltage is smaller than the voltage range of the input voltage, and then to convert the variable DC voltage having the smaller voltage range into an AC voltage that may be consumed in a load or that may be fed to a power grid. Thereby it is possible, for example, to improve the operating conditions of the DC/AC converter which may result in a larger range of the input voltage for the total power conversion, in an improved overall efficiency of the power conversion as well as in an improved harvesting of energy from a variable voltage source such as a photo-voltaic device or a wind energy device.

In one embodiment, the DC/AC power converter is a single-phase or multiple-phase DC/AC power converter, and/or a DC voltage source having a variable output voltage is connected to an input terminal of the DC/DC power device.

Thereby it is possible, for example, to convert a variable input DC voltage into an output AC voltage adapted to the type of load or grid.

In a further embodiment, the DC voltage source having a variable output voltage is a photo-voltaic device or a wind energy device. Thereby it is possible, for example, to apply the double stage DC/AC power converter to applications for electric power generation from renewable resources which due to the variable nature of the primary energy used deliver a varying output voltage.

DETAILED DESCRIPTION

In the following, an embodiment is described with reference to the enclosed figures.

Figure 1:
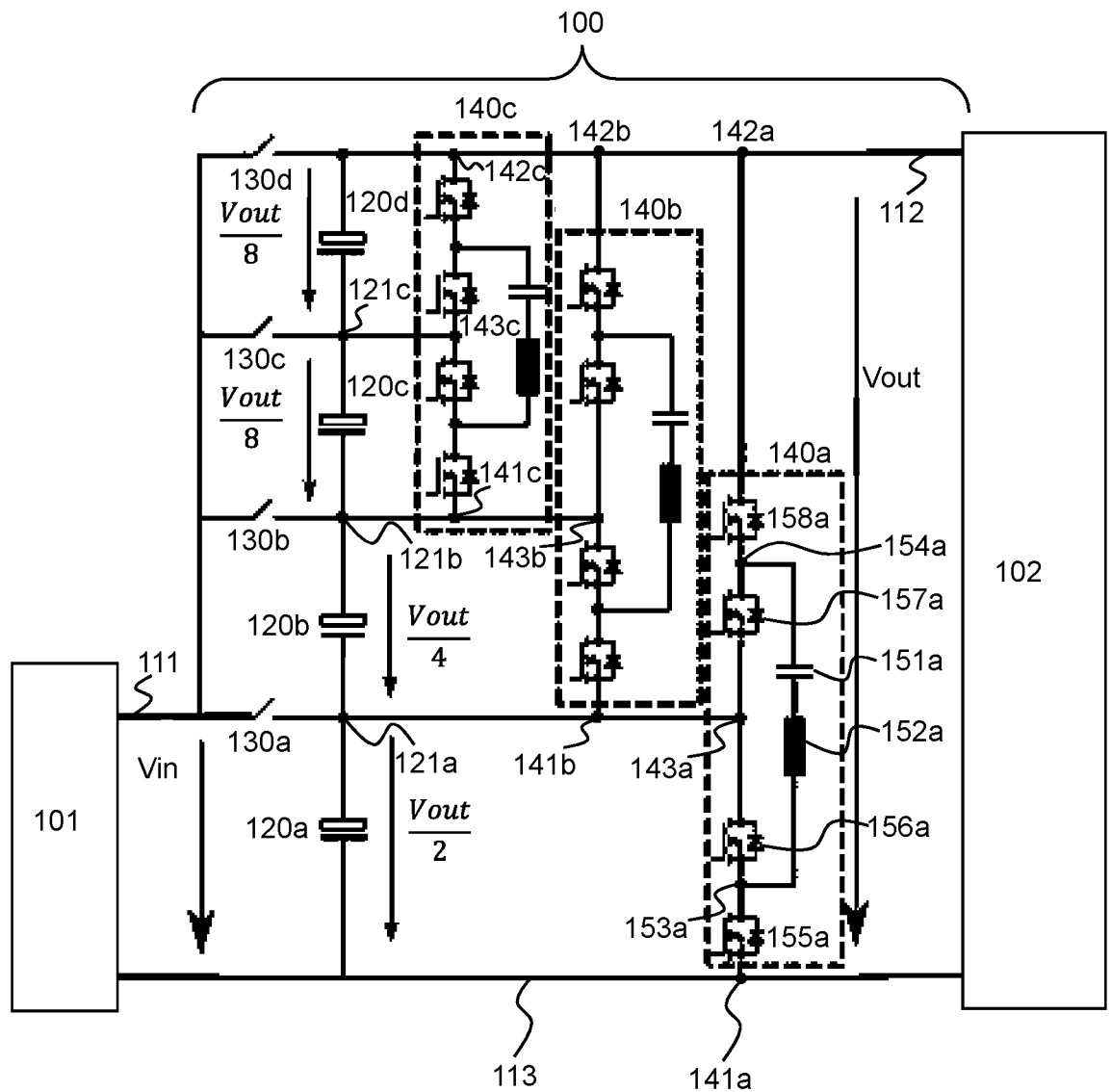
FIG. 1 is a schematic circuit diagram of a DC/AC power converter according to an embodiment of the present invention.

FIG. 1 is a schematic circuit diagram of a DC/AC power converter according to an embodiment.

A DC voltage source 101 having a variable output voltage is connected to an input of a DC/DC power converter 100, i.e. between an input terminal 111 and a ground terminal 113 of the DC/DC power converter 100. The DC voltage source 101 having a variable output voltage may for example be, but is not restricted to, a device for electricity generation from renewable resources such as a photo-voltaic device or a wind energy device.

An output of the DC/DC power converter 100, i.e. an output terminal 112 and the ground terminal 113 of the DC/DC power converter 100, is connected to an input of a DC/AC power converter 102. A single-phase or multiple-phase PWM inverter may, for example, be used as the DC/AC power converter 102. Not shown in the figure, an output of the DC/AC power converter 102 may be connected to a local load or an electric grid.

The DC/DC power converter 100 comprises four capacitors 120a, 120b, 120c, 120d connected in series between the output terminal 112 and the ground terminal 113. The three nodes between the transistors serve as capacitor connection points 121a, 121b, 121c via which the capacitors 120a, 120b, 120c, 120d are connected in series.

The four capacitors 120a, 120b, 120c, 120d form a capacitive voltage divider for an output voltage Vout between the output terminal 112 and the ground terminal 113. As a specific example, the capacitance values of the capacitors 120a, 120b, 120c, 120d are selected so that a voltage across the capacitor 120a is Vout/2, a voltage across the capacitor 120b is Vout/4, and a voltage across the capacitors 120c and 120d is Vout/8.

The DC/DC power converter 100 further comprises an input voltage switching unit configured to connect the input terminal 111 to one of the capacitor connection points 121a, 121b, 121c or to the output terminal 112. The capacitor connection points 121a, 121b, 121c together with the output terminal 112 thus form a group of switching connection points.

In the embodiment, the input voltage switching unit comprises four input switches 130a, 130b, 130c, 130d, according to the number of switching connection points 121a, 121b, 121c, 112. Each of the input switches is connected between the input terminal and a corresponding switching connection point 121a, 121b, 121c, 112.

The DC/DC power converter 100 further comprises three resonant converters 140a, 140b, 140c, each having a first terminal 141a, 141b, 141c, a second terminal 142a, 142b, 142c and third terminal 143a, 143b, 143c. Preferably, the resonant converters 140a, 140b, 140c have the same structure which in the following is described with reference to the resonant converter 140a:

A resonance capacitor 151a and a resonance inductor 152a are connected in series to each other between a first and a second internal node 153a, 154a. The resonant capacitor 151a may, for example, be a low voltage film capacitor or a multi-layer ceramic capacitor (MLCC). Four internal switches are connected in series to each other between the first terminal 141a and the second terminal 142a. A first internal switch 155a is connected between the first terminal 141a and the first internal node 153a. A second internal switch 156a is connected between the first internal node 153a and the third terminal 143a. A third internal switch 157a is connected between the third terminal and the second internal node 154a. A fourth internal switch 158a is connected between the second internal node 154a and the second terminal 142a. The internal switches may for example be realized as switching transistors with a freewheeling diode.

In the example shown in FIG. 1, the second terminals 142a, 142b, 142c of the three converters 140a, 140b, 140c are connected to the output terminal 112. The resonant converter 140a is connected with its first terminal 141a to the ground terminal 113 and with its third terminal 143a to the capacitor connection point 121a. The resonant converter 140b is connected with its first terminal 141b to the capacitor connection point 121a and with its third terminal 143b to the capacitor connection point 121b. The resonant converter 140c is connected with its first terminal 141c to the capacitor connection point 121b and with its third terminal 143c to the capacitor connection point 121c. The capacitor connection points 121a, 121b, 121c together with the output terminal 112 and the ground terminal 113 thus form a group of converter connection points.

During operation, the DC/DC power converter 100 converts a DC input voltage Vin supplied by the DC voltage source 101 into a DC output voltage Vout. The DC/AC power converter 102 then converts the DC output voltage Vout into a single-phase or multiple-phase AC voltage that may be fed to a local load or an electric grid (not shown in the figure).

For understanding the operation of the DC/DC power converter 100, an operation of the resonant converter 140a is described first. It is assumed that switch 130a is closed and that the other switches 130b, 130c, 130d are opened. In this case, the input terminal 111 is connected to the capacitor connection point 121a, and the input voltage Vin is loaded into the capacitor 120a.

For operating the resonant converter 140a, the switches are alternatingly switched on and off. In a first state, the first and third internal switches 155a, 157a are closed and the second and fourth internal switches 156a, 158a are opened. In a second state, the first and third internal switches 155a, 157a are opened and the second and fourth internal switches 156a, 158a are closed. Toggling between these two states is performed with a switching frequency that preferably is approximately equal to the resonant frequency of the resonant network 151a, 152a. Further, the switches preferably are operated with a duty cycle of approximately 50%.

In the first state, the resonant network 151a, 152a is connected between the first terminal 141a and the third terminal 143a, i.e. in parallel to the capacitor 120a. In this state, energy is transferred from the capacitor 120a into the resonant network 151a, 152a. In the second state, the resonant network 151a, 152a is connected between the second terminal 142a and the third terminal 143a, i.e. in parallel to a capacitor formed by a series connection of the capacitors 120b, 120c, 120d. In this state, energy is transferred from the resonant network 151a, 152a into the series connection of the capacitors 120b, 120c, 120d. The inductor 152a should be designed to guarantee a zero voltage transition of the switches.

In a steady state in which the building-up transients have faded out, the voltages across the capacitor 120a and across the series connection of the capacitors 120b, 120c, 120d are equilibrated via the resonant network according to a ratio of the corresponding capacitance values. The resonant converter 140a thus operates as a step-up converter, converting a voltage applied between its first and third terminals 141a, 143a, into a higher voltage between the first and second terminals 141a, 142a. In the special case in which the capacitance value of the series connection of the capacitors 120b, 120c, 120d is the same as the capacitance value of the capacitor 120a, the resonant converter 140a operates as a voltage doubler.

The remaining resonant converters 140b and 140c operate in the same way. In the special case in which the capacitance value of the series connection of the capacitors 120c, 120d is the same as the capacitance value of the capacitor 120b, the resonant converter 140b also operates as a voltage doubler. Further, if as the capacitance value of the capacitor 120c is the same as the capacitance value of the capacitor 120, the resonant converter 140c also operates as a voltage doubler.

Figure 2:
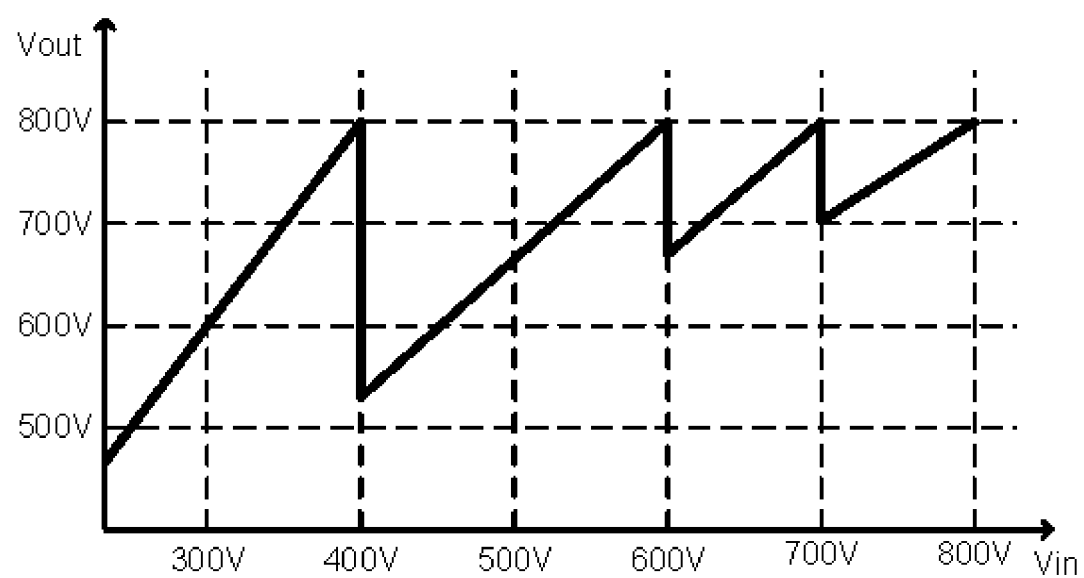
FIG. 2 is a diagram showing a relation between an input voltage and an output voltage of a DC/AC power converter included in the DC/AC power converter shown in FIG. 1.
Figure 3:
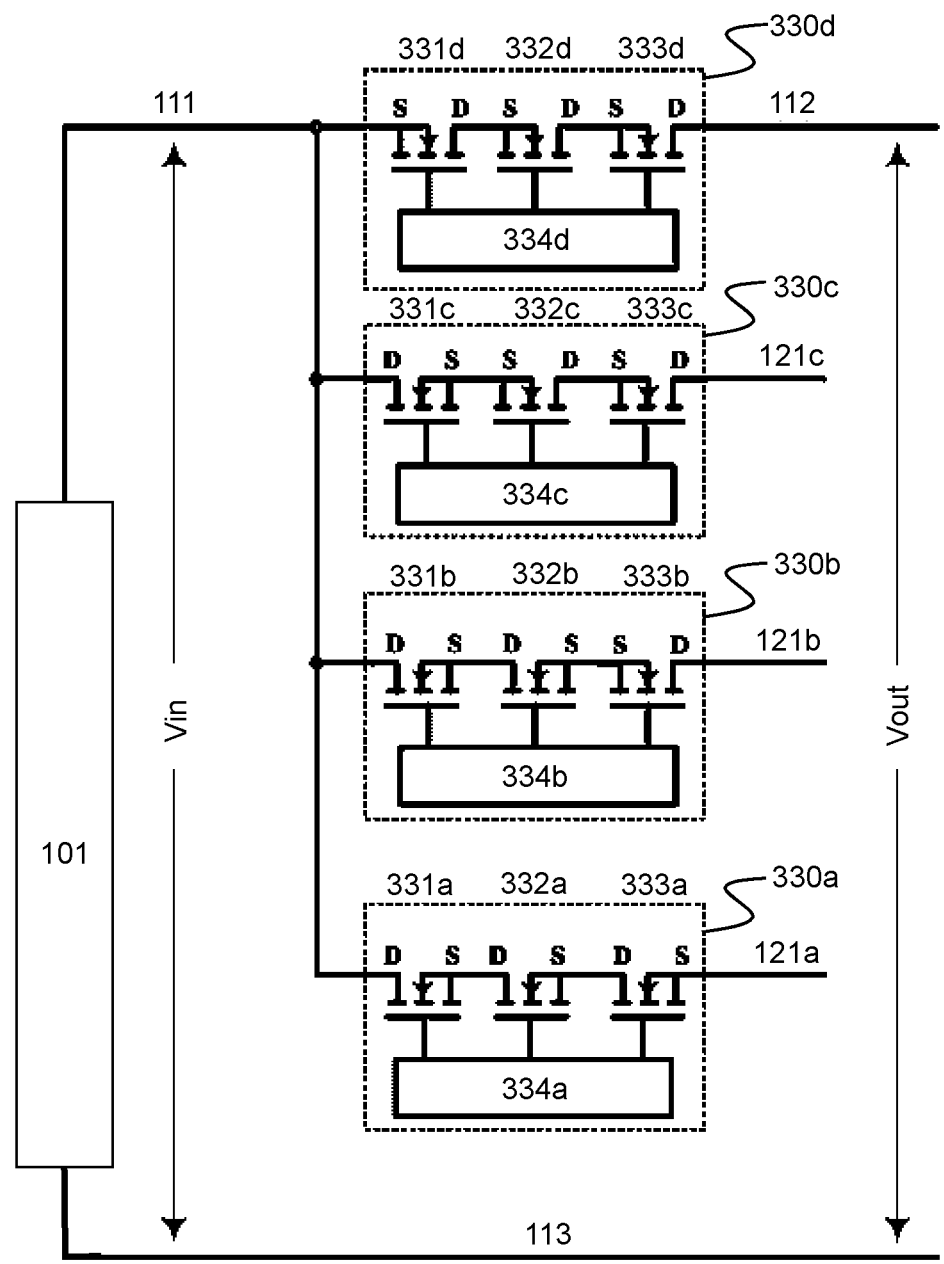
FIG. 3 is a schematic circuit diagram of an input voltage switching unit included in the DC/AC power converter shown in FIG. 1.
Figure 4:
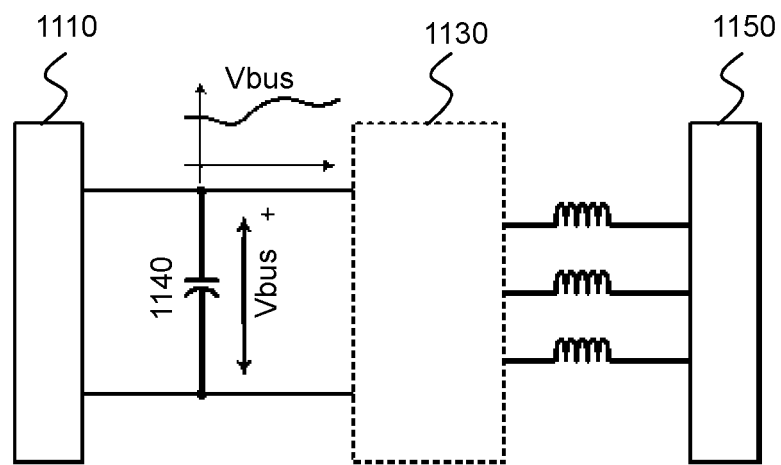
FIG. 4 is a schematic block diagram of a conventional DC/AC power converter with single conversion.
Figure 5:
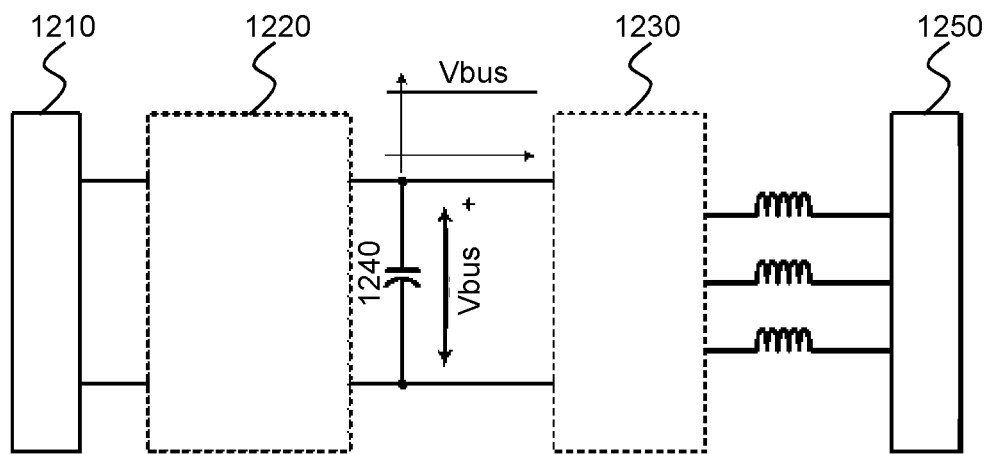
FIG. 5 is a schematic block diagram of a conventional DC/AC power converter with double conversion.

The total step-up ratio of the DC/DC power converter 100 depends on the switching connection point 121a, 121b, 121c, 112 to which the input terminal 111 is connected. Preferably, the switching connection point 121a, 121b, 121c, 112 is selected as a function of the input voltage Vin. FIG. 2 shows a specific example for a relation between the input voltage Vin and the output voltage Vout of the a DC/DC power converter 100. In this specific example, the output voltage Vout is limited to 800V when the input voltage Vin is less than 800V.

When the input voltage Vin in this specific example is 400V or less, the input terminal 111 is connected by the switch 130a to the switching connection point 121a, and the input voltage is loaded into the capacitor 120a. Due to the capacitive voltage divider dimensioned as indicated above, this voltage is doubled by the resonant converter 140a so that Vout=2*Vin. At an input voltage Vin of 400 V, the output reaches the maximum voltage of 800 V.

If the input voltage Vin exceeds 400 V, the input terminal 111 is connected by the switch 130b to the switching connection point 121b, and the input voltage is loaded into a series connection of the capacitors 120a, 120b. Due to the capacitive voltage divider dimensioned as indicated above, and the voltages generated by the resonant converters 140a, 140b, 140c, the voltage at the switching connection point 121b is Vout/2+Vout/4, so that Vout=4/3*Vin results. At an input voltage Vin of 600 V, the output reaches the maximum output voltage Vout of 800 V.

If the input voltage Vin exceeds 600 V, the input terminal 111 is connected by the switch 130c to the switching connection point 121c, and the input voltage is loaded into a series connection of the capacitors 120a, 120b, 120c. Due to the capacitive voltage divider dimensioned as indicated above, and the voltages generated by the resonant converters 140a, 140b, 140c, the voltage at the switching connection point 121c is Vout/2+Vout/4+Vout/8, so that Vout=8/7*Vin results. At an input voltage Vin of 700 V, the output reaches the maximum output voltage Vout of 800 V.

If the input voltage Vin exceeds 700 V, the input terminal 111 is connected by the switch 130c to the switching connection point 112, i.e. the output terminal, and the input voltage is loaded into a series connection of the capacitors 120a, 120b, 120c, 120d. Thereby, Vout=Vin results. At the maximum input voltage Vin of 800 V, the output reaches the maximum output voltage Vout of 800 V.

While in the above example, the corresponding switching connection points are selected in a way that the output voltage Vout does not exceed a maximum of 800 V, they may also be selected in a way that the output voltage Vout is greater than a minimum voltage specified in advance.

In this way, a new topology of a double stage power converter with high efficiency is provided. The DC/DC power converter 100 converts a variable DC input voltage Vin into a higher or equal variable DC output voltage Vout. The voltage range of the output voltage Vout, however, is smaller than the voltage range of the input voltage Vin.

The expected peak efficiency is approximately 99% or more. A simulation was carried out for an example in which the input voltage Vin is 580 V, the output voltage Vout is 772V, and the output power is 7500 W. The result was a total loss of 26 W which corresponds to an efficiency of 99.65%. Moreover, since the conversion system is a double conversion system, harvesting of a photovoltaic system is higher than state of the art solutions.

An advantage of the topology described above is that the output voltage Vout voltage is split in several sub-voltages. The input terminal 111 is connected to one of the sub-voltages depending to the input voltage Vin. This ensures larger range of the input operating voltage. Since the output voltage Vout split into sub-voltages, lower voltage semiconductor switches can be use, which brings a benefit of lower cost and losses, as will be described below.

The switches (e.g. switching transistors) and diodes in the resonant converters are rated to Vout/2. For example, if the maximum output voltage Vmax=800V, the switches voltage rating is VS>400V. This voltage rating is lower than in a classical boost converter where the switches must be rated to Vout. This is a benefit as low voltage devices are low cost devices with very low on-state resistance and this results in very low conduction losses. The switches are turned on/off when the resonant current is close to zero, having the value necessary to reach the Zero Voltage Transitions (ZVS) and avoid high switching losses.

Having in mind that the individual resonant converters have to equilibrate different voltages, the selection of switches is different for each converter. For example, for a maximum output voltage Vmax=800V, the devices should withstand the following voltages:

Converter 140c: 100V devices
Converter 140b: 200V devices
Converter 140a: 400V devices Depending on the switching connection point 121a, 121b, 121c, 112 to which the input terminal 111 is connected, there may be no need to operate all the resonant converters 140a, 140b, 140c. It may be possible to switch off one or more of the resonant converters, for example by constantly keeping opened the internal switches contained therein.

For example, if the input terminal 111 is connected to the output terminal 112 and Vout=Vin, no resonant converter has to be operated since the DC/DC power converter 100 merely transmits the voltage from the input terminal 111 to the output terminal 112 without converting it. If the input terminal 111 is connected to the switching connection point 121a and Vout=Vin, the resonant converter 140a is operated to achieve the function as a voltage doubler. The resonant converters 140b, 140c, however, need not be operated. If the input terminal 111 is connected to the switching connection point 121b and Vout=⁴⁄₃*Vin, the resonant converters 140a, 140b are operated, but the resonant converter 140a need not be operated. If the input terminal 111 is connected to the switching connection point 121d and Vout=⁸⁄₇*Vin, all the resonant converters 140a, 140b, 140c are operated.

Thus, it is possible to easily identify for each voltage gain the resonant converter(s) that do(es) not process the energy towards the output and therefore need not be operated constantly. It suffices to turn on those resonant converter(s) on/off from time to time to guarantee the adequate voltage levels at the bus capacitors.

By turning off the not required resonant converter(s), gate and switching losses in the cells that do not process the output power may be reduced. Additionally, the resonant currents may be minimized and conduction losses may be reduced as well.

In the following, different ways of realizing the switches 130a, 130b, 130c, 130d are described. They may, for example, be electromechanical contactors, with virtually no losses. A free-wheel diode can be connected in parallel with the switch 130d. A function of this diode is to eliminate commutation over-voltage while the input is being switched from one to another DC bus voltage. Such an input voltage selector does not require any external inductor. Thus, the circuit can be low cost with high conversion efficiency.

The switches 130a, 130b, 130c, 130d may also be formed as semiconductor-based switches, preferably as MOSFETs such as low voltage Si MOSFETs, which are for example controlled via separate gate drivers. The MOSFETs may be the same devices as used in the series resonant converters.

FIG. 2 shows a further example for an input voltage switching unit. The four switches 330a, 330b, 330c, 330d in this example are realized with low voltage MOSFET switches. The voltage blocking capability switches of the switches is half the maximum output voltage Vout. Each switch 330a, 330b, 330c, 330d is realized as a series connection of three MOSFETS.

In the switch 330d, three MOSFETs 331d, 332d, 333d are connected in series in the same direction. The direction is defined as the first direction, where the first direction means that the MOSFET's source terminal is connected on the left side of the switch.

In the switch 330c, three MOSFETs are connected in series so that two MOSFETS 332c, 333c are connected in the first direction, while one MOSFET 331c is connected in a second direction opposite to the first direction that means with its source terminal on the right.

In the switch 330b, three MOSFETs are connected in series so that one MOSFET 333b is connected in the first direction, while two MOSFETs 331b, 332b are connected in the second direction.

In the switch 330a, three MOSFETs 331a, 332a, 333a are connected in series in the second direction.

Each switch composed of three series connected MOSFETs is controlled by an individual gate driver 330a, 330b, 330c, 330d. The gate driver has a function to control the state of the MOSFETs and to ensure proper distribution of the blocking voltage among the series connected MOSFETs. The gate driver command is received from an upper level control circuit, wherein the control circuit measures the input voltage Vin and takes a decision which switch has to be conducting.

With the structure described above, the switches 330a, 330b, 330c, 330d are realized with asymmetric voltage blocking capability, thus providing the required reverse blocking capability. In this case, if the maximum output voltage is 800 V, 200 V MOSFETs with very low on-state resistance can be used. Hence, low losses and high reliability van be achieved.

Even if four capacitors, four switches and three resonant converters are used in the embodiment described above, the present invention is not limited thereto. Any number of capacitors greater than or equal to three may be used. The number of switches and resonant converters required then depends on the number of capacitors used.

The resonant converters need not be connected all with one of their terminals to the output terminal. Instead, they also may be connected all with one of their terminals to ground terminal, or may not have a common connection point at all for one of their terminals.

Instead of resonant converters, any other type of step-up converters may be used which is able to generate, from a voltage at a capacitor, another voltage at a capacitor connected in series to this capacitor.

Instead of the switches described in the embodiment above, any other construction may be used that enables the input voltage switching unit configured to connect the input terminal selectively to each one of the switching connection points.

In summary, the present application relates to a double conversion of a voltage from a DC voltage source first into another DC voltage and then into an AC voltage to be consumed by a local load or to be supplied to a power grid. A DC/DC power converter used in the course of this conversion comprises three or more capacitors connected in series between an output terminal and a ground terminal, the three or more capacitors being connected in series by means of two or more capacitor connection points, and an input voltage switching unit configured to connect an input terminal to one of a group of switching connection points, the group of switching connection points comprising the two or more capacitor connection points and the output terminal. With such a DC/DC power converter it is possible, for example, to convert a variable DC voltage at the input into a variable DC voltage at the output, wherein the voltage range of the output voltage is smaller than the voltage range of the input voltage. Thereby it is possible, for example, to improve the operating conditions of a subsequent DC/AC converter which may result in a larger range of the input voltage for the total power conversion, in an improved overall efficiency of the power conversion as well as in an improved harvesting of energy from a variable voltage source such as a photo-voltaic device or a wind energy device.

Among the main advantages of the double-conversion power converter described above, especially if used in the field of photovoltaic electricity generation, are:

Highly efficient DC/DC power converter,

No need for any input filter inductor, which results in an improvement of size, cost and efficiency of entire solar converter, No switching losses of the input boost converter, only conduction losses, Low voltage MOSFETs are used, which results in very low conduction losses, An expected efficiency of the boost converter depends on the selected devices. The expected peak efficiency of the input DC/DC power converter is above 99.0%.

While the present invention has been illustrated and described in detail in the drawings and the foregoing description, such illustration and description are to be considered illustrative or exemplary and not restrictive. The invention is not limited to the disclosed embodiment. From reading the present disclosure, other modifications will be apparent to a person skilled in the art. Such modifications may involve other features, which are already known in the art and may be used instead of or in addition to features already described herein.

The invention has been described in conjunction with a specific embodiment herein. However, other variations to the disclosed embodiment can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

Although the present invention has been described with reference to specific features and embodiment thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A direct current DC/DC power converter comprising:
an input terminal;
an output terminal;
a ground terminal;
three or more capacitors connected in series between the output terminal and the ground terminal, the three or more capacitors being connected in series by means of two or more capacitor connection points;
an input voltage switching unit configured to connect the input terminal to one of a group of switching connection points, the group of switching connection points comprising the two or more capacitor connection points and the output terminal; and
two or more step-up converters, wherein each step-up converter has a first terminal, a second terminal, and a third terminal connected to one of a group of converter connection points, wherein the each step-up converter is configured to convert a voltage applied between the first and second terminals to a greater voltage between the first and third terminals.

2. The DC/DC power converter according to claim 1, being further configured to:
select one of the switching connection points based on an input voltage applied to the input terminal; and
control the input voltage switching unit so as to connect the input terminal to the selected switching connection point.

3. The DC/DC power converter according to claim 2, being further configured to select the switching connection point to which the input terminal is to be connected in a way that an output voltage is greater than a minimum voltage specified in advance.

4. The DC/DC power converter according to claim 3, wherein:
the input voltage switching unit comprises three or more input switches, and
each of the input switches is connected between the input terminal and a different switching connection point.

5. The DC/DC power converter according to claim 4, wherein
the group of converter connection points comprises the two or more capacitor connection points, the output terminal, and the ground terminal, and wherein
each step-up converter is configured to convert a voltage applied between the first terminal and second terminals to a greater voltage between the first and third terminals.

6. The DC/DC power converter according to claim 1, wherein:
the input voltage switching unit comprises three or more input switches, and
each of the input switches is connected between the input terminal and a different switching connection point.

7. The DC/DC power converter according to claim 6, being further configured to select, depending on selected switching connection points to which the input terminal is to be connected, which of the step-up converters is to be operated and which is not be operated.

8. The DC/DC power converter according to claim 6, wherein:
the input switches are formed as electromechanical conductors; and/or
the input switches are formed as semiconductor switches; and/or
the input switches are formed each as a series connection of three or more MOSFETs.

9. The DC/DC power converter according to claim 8, wherein:
the three or more MOSFETs are connected in a way that an asymmetric blocking voltage capability is provided.

10. The DC/DC power converter according to claim 1, wherein
the group of converter connection points comprises the two or more capacitor connection points, the output terminal, and the ground terminal, and wherein
each step-up converter is configured to convert a voltage applied between the first terminal and second terminals to a greater voltage between the first and third terminals.

11. The DC/DC power converter according to claim 10, wherein the step-up converters are resonant converters, each comprising:
a resonance capacitor and a resonance inductor connected in series to each other between a first and a second internal node;
a first internal switch connected between the first terminal and the first internal node;
a second internal switch connected between the first internal node and the third terminal;
a third internal switch connected between the third terminal and the second internal node; and
a fourth internal switch connected between the second internal node and the second terminal.

12. The DC/DC power converter according to claim 11, wherein the internal switches are formed as semiconductor switches.

13. The DC/DC power converter according to claim 12, being further configured to operate each of the resonant converters by alternately toggling between a first state in which the first and third internal switches are closed and the second and fourth internal switches are opened, and a second state in which the first and third internal switches are opened and the second and fourth internal switches are closed.

14. The DC/DC power converter according to claim 11, being further configured to operate each of the resonant converters by alternately toggling between a first state in which the first and third internal switches are closed and the second and fourth internal switches are opened, and a second state in which the first and third internal switches are opened and the second and fourth internal switches are closed.

15. The DC/DC power converter according to claim 14, being further configured to operate the resonant converters in a way that the internal switches are switched with a duty cycle of approximately 50%.

16. The DC/DC power converter according to claim 15, being further configured to select, depending on selected switching connection points to which the input terminal is to be connected, which of the step-up converters is to be operated and which is not be operated.

17. A method of operating a direct current DC/DC power converter, comprising:
applying an input voltage between an input terminal and a ground terminal of the DC/DC power converter; and
supplying the input voltage via an input voltage switching unit to one of a group of switching connection points, the group of switching connection points comprising two or more capacitor connection points by which three or more capacitors are connected in series between an output terminal and the ground terminal, and the output terminal, wherein each of two or more step-up converters has a first terminal, a second terminal, and third terminal connected to one of a group of converter connection points comprising the two or more capacitor connection points, the output terminal, and the ground terminal, wherein each step-up converter is configured to convert a voltage applied between the first and second terminals to a greater voltage between the first and third terminals.

18. A double stage direct current (DC)/alternating current (AC) power converter comprising:
a DC/DC power converter; and
a DC/AC power converter connected to an output terminal of the DC/DC power converter,
wherein the DC/DC power converter includes:
an input terminal;
the output terminal;
a ground terminal;
three or more capacitors connected in series between the output terminal and the ground terminal, the three or more capacitors being connected in series by means of two or more capacitor connection points;
an input voltage switching unit configured to connect the input terminal to one of a group of switching connection points, the group of switching connection points comprising the two or more capacitor connection points and the output terminal; and
two or more step-up converters, wherein each step-up converter has a first terminal, a second terminal, and a third terminal connected to one of a group of converter connection points, wherein the each step-up converter is configured to convert a voltage applied between the first and second terminals to a greater voltage between the first and third terminals.

19. The double stage DC/AC power converter according to claim 18, wherein:
the DC/AC power converter is a single-phase or multiple-phase DC/AC power converter; and/or
a DC voltage source having a variable output voltage is connected to the input terminal of the DC/DC power device.

20. The double stage DC/AC power converter according to claim 19, wherein the DC voltage source having a variable output voltage is a photo-voltaic device or a wind energy device.

* * * * *